Oct. 23, 1928.
J. A. SHAW
1,689,059
METHOD OF PREVENTING DECOMPOSITION OF BICARBONATES IN SOLUTION
Filed Oct. 3 1925
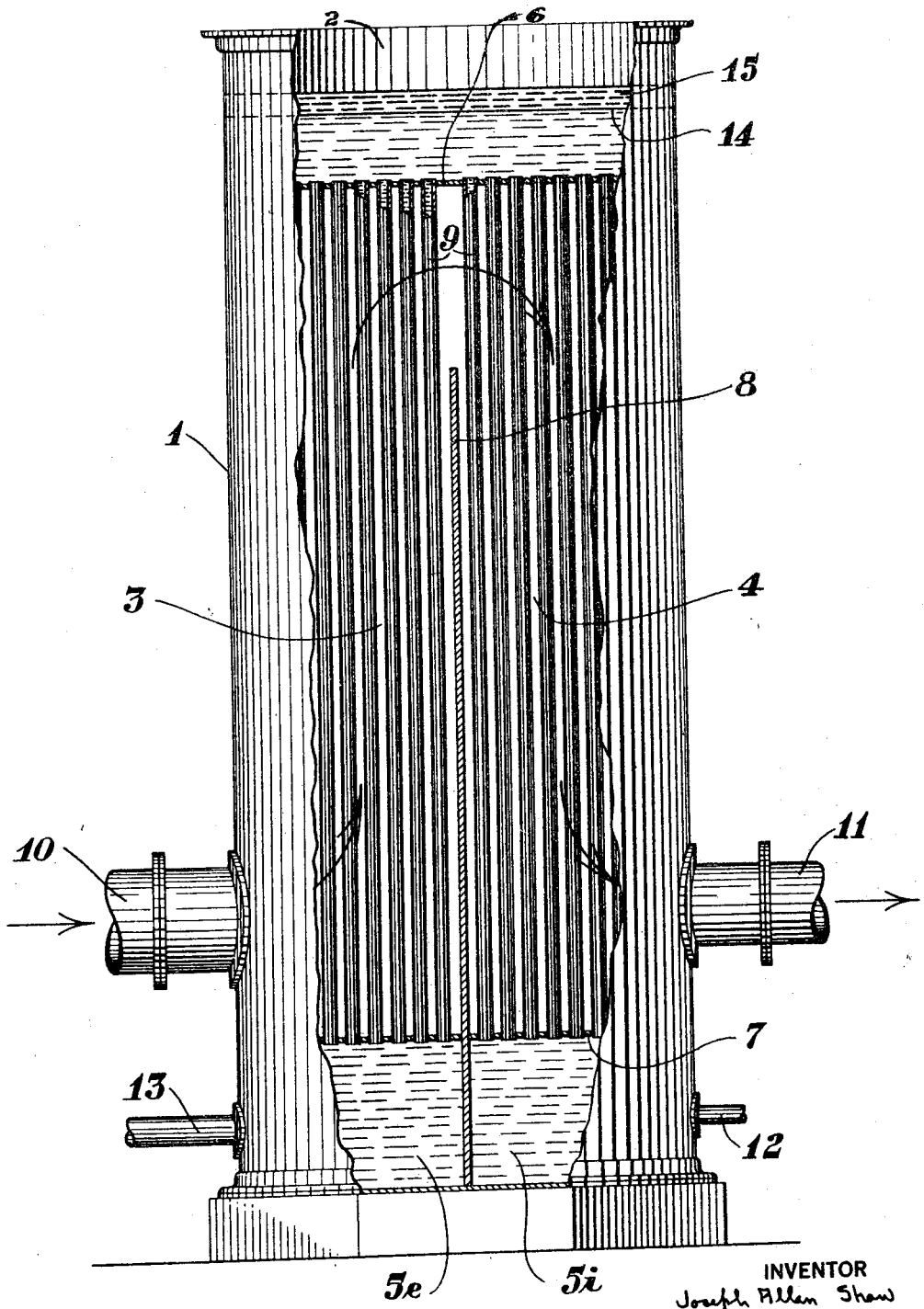
INVENTOR
Joseph Allen Shaw
BY Byrnes, Stebbins &
Parmelee
HIS ATTORNEYS Patented Oct. 23, 1928.

1,689,059

UNITED STATES PATENT OFFICE.

JOSEPH ALLAN SHAW, OF PITTSBURGH, PENNSYLVANIA, ASSIGNOR TO THE KOPPERS COMPANY, OF PITTSBURGH, PENNSYLVANIA, A CORPORATION OF DELAWARE.

METHOD OF PREVENTING DECOMPOSITION OF BICARBONATES IN SOLUTION.

Application filed October 3, 1925. Serial No. 60,366.

This invention relates to a method of preventing the decomposition of bicarbonates, such as calcium bicarbonate, in solution, and is particularly valuable in large scale apparatus such as the primary gas coolers of coal gas plants, although the invention has many other applications.

In apparatus of this character where it is necessary to employ as a cooling agent waters which are known as "temporarily hard", that is, those containing varying amounts of calcium bicarbonate, it is found that upon heating of the solution carbon dioxide gas escapes until the vapor pressure in the atmosphere above the solution is built up and calcium bicarbonate decomposes until the deficiency in $CO_2$ concentration in the solution is made up according to the following reaction:

$$Ca(HCO_3)_2 = CaCO_3 + CO_2 + H_2O$$

The highly insoluble $CaCO_3$ separates out from the solution and is deposited as scale. This scale is a source of great annoyance in such apparatus as gas coolers, where the water tubes become encrusted with the scale and require frequent cleaning in order to get efficient results out of the apparatus.

I provide for artificially holding the $CO_2$ in solution. This may be done in several ways as, for example, by covering the solution with a liquid of low vapor pressure, such as a thick mineral oil. This coating of oil largely prevents the escape of $CO_2$, or at least retards it to a great extent, thus preventing the decomposition of calcium bicarbonate according to the above reaction, or any reaction involving the loss of $CO_2$ as long as the evolution of $CO_2$ is not violent or accompanied by boiling or the like. The use of an oil film or layer is also desirable in that it prevents evaporation or steaming of the solution so long as the boiling point is not reached, and this is of particular value where the apparatus is located within a building or other enclosure having any steel or iron work. The use of the oil layer materially reduces the tendency to rust, which is ordinarily present.

The accompanying figure of drawings, which illustrates a preferred embodiment of the invention as applied to a gas cooler, shows a side elevation, partly broken away, of a primary gas cooler embodying my invention.

In the illustrated embodiment of the invention, there is shown a cooler consisting of a vertical shell 1 which is divided into five compartments 2, 3, 4, $5^1$ and $5^e$ by horizontal tube sheets 6 and 7 and a vertical baffle 8. The compartment 2, which is that portion of the cooler space above the tube sheet 6, is open to the atmosphere. The compartments 3 and 4 communicate with one another over the baffle wall 8, and the compartments $5^1$ and $5^e$ lie below the tube sheet 7 and are separated from one another by the baffle 8. The tube sheets 6 and 7 support a large number of water tubes 9 which offer free communication between the compartment 2 and the compartments $5^1$ and $5^e$.

The gas to be cooled enters the cooler through an inlet 10, flows upward through the compartment 3 over the top of the baffle 8 and into compartment 4, thence downwardly to an outlet 11 where it leaves the cooler. The path of the gas is indicated in the figure by arrows.

Cooling water enters the compartment $5^1$ through an inlet 12 and rises through the right hand bank of tubes 9 to the compartment 2, then down through the left hand bank of tubes into the compartment $5^e$, from which it flows away through an exit line 13. The flow of cooling water is preferably so regulated that the level of the water in the compartment 2 will be substantially constant, as indicated, for example, by the line 14.

The gas entering the cooler is generally at a temperature of about 75 degrees C. and is reduced therein to a temperature of 28 to 30 degrees C. As will be noted, the cooler operates on the counter current system and the temperature of the cooling water approaches that of the gas entering the cooler. As above explained, if temporarily hard waters are used, this causes formation of scale and loss of $CO_2$ because of the evaporation and steaming of the water.

In order to prevent the escape of $CO_2$ and the consequent formation of scale on the water tubes 9, a layer 15 of oil is placed over the water in the compartment 2 and this effectually seals the cooler against escape of water vapor and $CO_2$. In this way, the decomposition of calcium carbonate and the loss of steam are prevented, frequent shut-downs for cleaning of scale are unnecessary, and the tendency of surrounding apparatus to rust is minimized.

The liquid layer preferably used is a viscous mineral oil, such as petroleum distillate or coal tar oil. However, any other liquid which possesses the desired characteristics, that is to say, low vapor pressure, specific gravity less than water and non-miscibility with water, may be used. For example, discarded engine oil or old wash oil from a benzol extraction plant may be employed.

Theoretically, it is only necessary to maintain an unbroken film of oil over the water surface, but in practice it is generally preferable to use a layer of from one-half to three inches in thickness or, in some cases, even more.

While I have illustrated and described one embodiment of the invention, it will be understood that it is not thus limited as it may be otherwise embodied within the scope of the following claims.

I claim:

1. The method of preventing the decomposition of bicarbonates in solution upon heating thereof, which includes covering the solution with a substanially immiscible liquid of low vapor pressure.

2. The method of preventing the decomposition of bicarbonates in solution upon heating thereof, which includes covering the solution with mineral oil.

3. The method of preventing the decomposition of bicarbonates in solution upon heating thereof, which includes covering the solution with oil.

4. The method of preventing the decomposition of bicarbonates in solution upon heating thereof, which includes covering the solution with a layer of substantially immiscible liquid of low vapor pressure, said layer being at least about one-half inch thick.

5. The method of preventing the decomposition of bicarbonates in solution upon heating thereof, which includes covering the solution with a layer of oil from about one-half inch to about three inches thick.

6. The method of preventing the decomposition of bicarbonates in solution upon heating thereof, which includes covering the solution with a liquid of low vapor pressure, the liquid being substantially immiscible with the solution.

7. The method of preventing the decomposition of bicarbonates in solution upon heating thereof, which includes maintaining a film of oil on the surface of the solution.

In testimony whereof I have hereunto set my hand.

JOSEPH ALLAN SHAW.